Dec. 11, 1962  R. G. Y. MOSSÉ  3,067,931
COMPUTING DEVICE FOR CORRELATING AND ANALYZING
DATA ON THREE SUPERIMPOSABLE DATA CARRIERS
Filed Dec. 31, 1959  2 Sheets-Sheet 1

INVENTOR.
ROBERT G. Y. MOSSÉ
ATTORNEY

Dec. 11, 1962  R. G. Y. MOSSÉ  3,067,931
COMPUTING DEVICE FOR CORRELATING AND ANALYZING
DATA ON THREE SUPERIMPOSABLE DATA CARRIERS
Filed Dec. 31, 1959  2 Sheets-Sheet 2
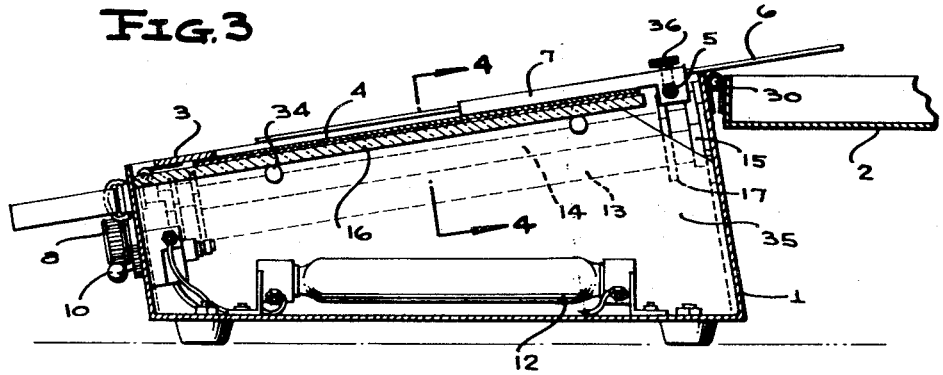
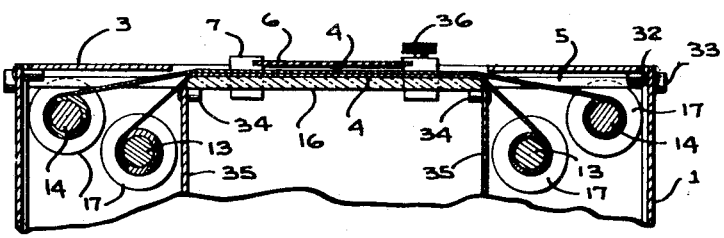
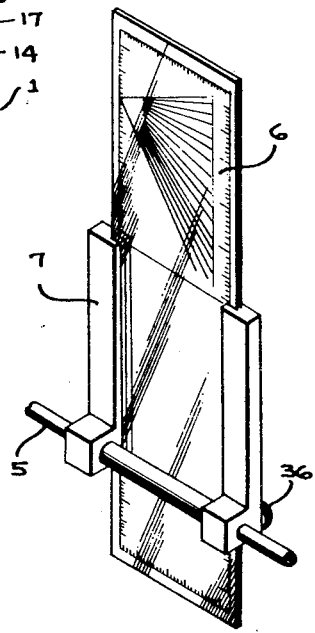
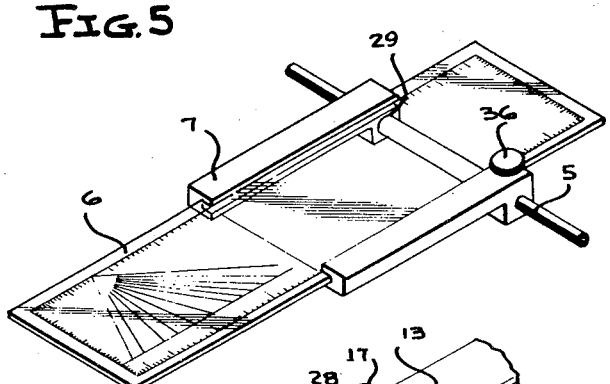
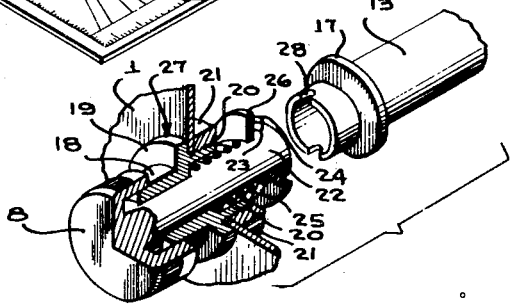
INVENTOR.
ROBERT G. Y. MOSSÉ
BY
ATTORNEY

United States Patent Office 3,067,931
Patented Dec. 11, 1962

3,067,931
COMPUTING DEVICE FOR CORRELATING AND ANALYZING DATA ON THREE SUPERIMPOS-ABLE DATA CARRIERS
Robert G. Y. Mossé, 12 Ave. Rochambeau, Grenoble, France
Filed Dec. 31, 1959, Ser. No. 863,326
Claims priority, application France Jan. 16, 1959
1 Claim. (Cl. 235—61)

This invention relates to a correlating and analyzing device, and it more particularly relates to a device of the aforesaid type which is adapted to present the correlated data for immediate visual observation.

Prior devices for correlating and analyzing data generally were limited to the correlation of only two variables and so could not take into consideration a third variable such as the "time" element.

It is one object of the present invention to provide a device which by the superposition of two or more sets of data such as curves, graphs, etc. enables ready computation and quick visual analysis and observation of correlated data such as rates of change per unit of time.

Another object of the present invention is to provide an improved visually observable correlating device which is adapted to accurately correlate data using three variables, one of which is the "time" factor.

Another object of the present invention is to provide a correlating device of the aforesaid type which is relatively simple in construction and easy to use.

Other objects of the present invention are to provide an improved correlating device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings, in which:

FIG. 3 is a sectional view on line 3—3 of FIG. 1.

FIG. 4 is a sectional view on line 4—4 of FIG. 3.

FIG. 5 is a perspective view of the slide assembly.

FIG. 6 is a reverse perspective view of the slide assembly of FIG. 5.

FIG. 7 is an exploded perspective view of a spool bearing and control knob assembly, partially in section.

Figure 1:
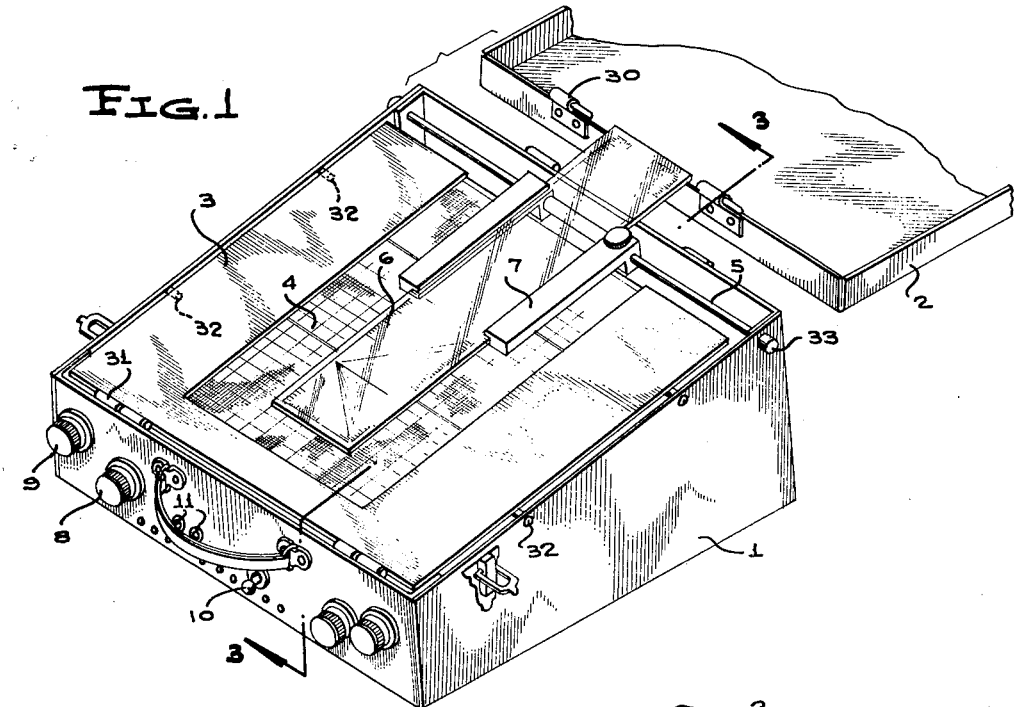
FIG. 1 is a top perspective partly exploded view of a device embodying the present invention.
Figure 2:
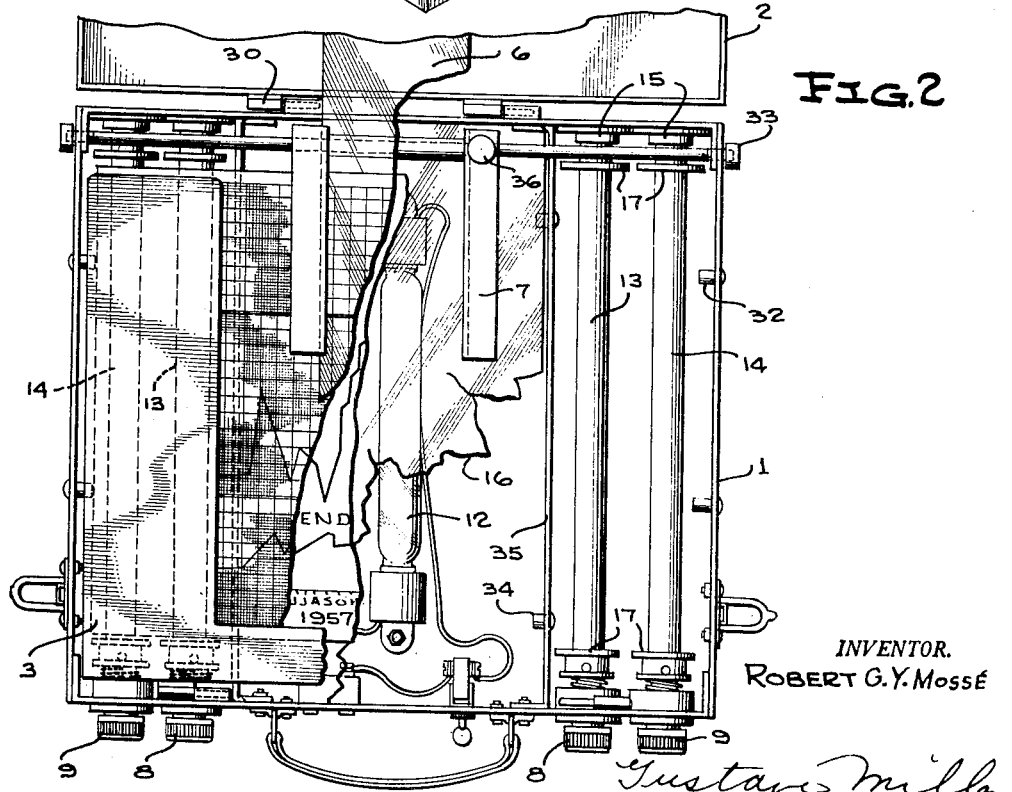
FIG. 2 is a top plan view of the device of FIG. 1, but with parts broken away.

Referring in greater detail to the drawings, wherein similar reference characters refer to similar parts, there is shown a casing 1 of the portable type which is provided with a readily removable hinged cover 2. Suitable directions and instructions may be located on the inside of the cover 2. The hinge 30 may be of the readily separable type, such as conventionally used on portable typewriter cases and covers.

The top of the casing 1 is partially covered by a U-shaped plate 3 which has a central cut-out portion so that plate 3 forms a frame around a central opening over a frosted glass window or screen 16. This cut-out plate or frame 3 is hingedly mounted in the casing 1 by suitable separable hinges 31 and is supported over the frosted glass window or screen 16 in the proper plane by inwardly extending studs 32 in the opposite sides of casing 1. The glass or screen 16 is supported on studs 34 on longitudinally extending intermediate walls providing a glass stand 35. In this cut-out opening appear the films, supported on the window or screen 16, for having the curves or data to be analyzed. The data or curves are printed or written on transparent films 4, there being two such films. One of the films 4 extends between an inner pair of spools 13, while the other film extends between an outer pair of spools 14.

The films 4 are mounted on their spools in the same manner as photograph film is mounted on spools in a camera, as by longitudinal slots in the spools. The film 4 between the spools 14 overlies the film 4 between the spools 13, so that one film 4 is always superposed over the other within the central opening over the glass window or screen 16, suitably supported in the casing 1 on the glass stand 35.

The films 4 described above each may be imprinted with a series of charts having different curves or data, and one series may be graph coordinates, often known as "graph paper," so that by manipulation of the spools 13 and 14 individually, the curves or data on one film can be made to coordinate with the curves or data or graph coordinates on the other film over the screen or window 16.

Extending transversely across the casing 1 and through the opposite sides thereof and adjacent the rear edge thereof, is a rod 5 on which is slidably positioned a channeled frame 7 having a shaftway 29.

A locking thumb screw 36 extends to the shaftway 29 for locking the channeled frame 7 in any adjusted position. In the channeled frame 7 there is slidably positioned a transparent rigid data strip 6. The rod 5 is threaded at each end for receiving round nuts 33 for removably holding the rod 5 in the casing 1. The rigid data strip 6 is slidable in a plane transverse to that of the rod 5 and is provided with linear scales along its sides as well as with a ratio scale of radiating lines. Obviously, any suitable data can be placed on this rigid data strip to coordinate with any suitable data on the two films 4.

The spools 13 and 14 are each provided with an actuating knob at the front of the casing, as indicated at 8 and 9 respectively, while; the opposite ends of the spools are journaled in bearings 15.

An off-on switch is provided at 10, while electric circuit plug receptacles are provided at 11 on the front of the casing. An interior lamp 12 is operatively connected to the switch 10. This lamp 12 illuminates the data on the films 4 and the transparent rigid data strip 6 through the glass window or screen 16.

The spools 13 and 14 are releasably journaled between bearings 15 in the rear side of the casing 1 and the bearings 27 provided in the front side of the casing 1. Each bearing 27 includes a sleeve 18 having an integral flange 19 on the other side of which is a threaded but larger sleeve 20 on which is threaded a round nut 21 for holding the bearing 27 in place through an appropriate opening in the front side of the casing 1. The threaded sleeve 20 extends through the opening in the front side of the casing 1 with the flange 19 on the outside and nut 21 on the inside of the casing.

Integrally extending from the knob 8 or 9 is a rod 22 having a transverse aperture 23 slightly spaced from its end, through which is placed a pin 24, after first inserting the rod 22 through the sleeve 18 so that the transverse aperture 23 is beyond the end of the larger threaded sleeve 20, and after a coil spring 25 is placed thereon and is slightly compressed by a washer 26. The pin 24 thus holds the rod 22 yieldably but retractably in position. One end of each spool 13 and 14 is notched as at 28, so that when the other end is placed in bearings 15, the notched ends 28 fit over the end of rod 22 and about the end of pin 24, thereby holding the spools 13 or 14 removably in position. The cooperation of the notched end 28 and transverse pin 24 causes the spool 13 or 14 to have its rotation positively controlled by the knob 8 or 9.

Each spool 13 and 14 is provided with a substantially fixed washer 17 inwardly of each of its opposite ends. These washers 17 act as guides for the opposite edges of the film strips 4.

Each film strip 4 is imprinted with the charts, graph coordinates or curves in appropriate frames. The number of frames may be varied as desired. By individually moving the film strips which are superimposed relative to one another, various different curves and data can be superimposed. This provides an immediate visual comparison between the different curve and data combinations.

With the desired curves and data superimposed within the window, the rigid data strip 6 is moved down into superimposed relation to the two curves and the difference between corresponding points on the two curves is readable on the linear scales on the rigid data strip 6. If other portions of the curves are to be compared, it is merely necessary to slide the channeled frame 7 along the rod 5 until the desired position is reached, after which the rigid data strip 6 is adjusted to the portions of the curves or data to be compared.

The rigid data strip 6 is additionally provided with a ratio scale comprising a central point from which extend a plurality of radiating lines. These radiating lines extend both above and below the central point so that the ratio measured may be both smaller and larger than one to one. In this respect, each radiating line is spaced from the adjacent radiating line by a predetermined angle corresponding to a certain percentage increase or decrease depending on whether they lie above or below the central axis.

By coinciding one of these radiating lines with the distance between corresponding points on the data on the two films, the time rate of increase or decrease can be determined. For example, if the ratio scale extends over a period between 1956 and 1958 expressed linearly along the base of the scale, if the central point is on 1956, the annual rate of increase between 1956 and 1958 will be measured on the radiating line corresponding to the slope between the two points measured.

In this manner, if one knows the output of a factory at time T and the annular rate of increase is determined, the output at any certain date can be immediately determined. Furthermore, if the output at time T is known as well as the annular rate of increase and the desired output, it can be easily determined when the desired output will be attained. It is also easily possible to determine the required rate of increase to such a desired output in a given time.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A computing device for use in correlating and analyzing data comprising an open top rectangular casing having bottom and side walls, a transparent window mounted in said casing across the open top thereof, a source of illumination mounted within said casing beneath said transparent window, two sets of spools mounted in opposite side walls of said casing, actuating means for each spool on the outer side of a mounting wall, a transparent data film strip wound on each set of spools for controllable travel therebetween in either direction between the spools of each set, each said film strip passing across the top surface of said window, one superimposed over the other, in travel between its spools, a third transparent data strip, and means for mounting said third data strip for travel transversely across and longitudinally of the portions of said film strips superimposed over said window, said third transparent data strip being a rigid plate, said mounting means for said rigid plate data strip comprising a frame extendable over said window and having cooperating channels in which said rigid plate data strip is slidably supported, a rod mounted in opposite side walls of said casing, means for adjustably mounting said channeled frame on said rod with said rod extending transversely of said channels, and means for locking said channeled frame in adjusted position on said rod.

References Cited in the file of this patent

UNITED STATES PATENTS

| | | |
|---|---|---|
| 1,388,915 | Behncke | Aug. 30, 1921 |
| 1,581,047 | Folsom | Apr. 13, 1926 |
| 1,609,571 | Olson | Dec. 7, 1926 |
| 1,656,786 | Gahan | Jan. 17, 1928 |
| 1,885,617 | Meyer | Nov. 1, 1932 |
| 2,068,226 | Buck | Jan. 19, 1937 |
| 2,219,429 | Osterberg | Oct. 29, 1940 |
| 2,494,536 | Atwood | Jan. 17, 1950 |
| 2,494,926 | Baker | Jan. 17, 1950 |

FOREIGN PATENTS

| | | |
|---|---|---|
| 990,243 | France | June 6, 1951 |